United States Patent [19]
Cargille

[11] Patent Number: 5,952,573
[45] Date of Patent: Sep. 14, 1999

[54] MICRO-BEAM MOTION SENSOR

[75] Inventor: Donald R. Cargille, Culver City, Calif.

[73] Assignee: Hughes Electronics Corporation, El Segundo, Calif.

[21] Appl. No.: 08/851,039

[22] Filed: May 5, 1997

[51] Int. Cl.⁶ .................................................. G01P 9/04
[52] U.S. Cl. .................................................. 73/504.15
[58] Field of Search ................. 310/329; 73/504.12, 73/504.14, 504.15, 514.33, 514.01

[56] References Cited

U.S. PATENT DOCUMENTS

| | | | |
|---|---|---|---|
| 5,606,128 | 2/1997 | Araki | 73/514.33 |
| 5,659,138 | 8/1997 | Iwata | 73/514.33 |
| 5,796,000 | 8/1998 | Fujiu | 73/504.15 |

*Primary Examiner*—Christine K. Oda
*Attorney, Agent, or Firm*—Georgann S. Grunebach; M. W. Sales

[57] ABSTRACT

A cantilevered micro-beam formed on a micro-circuit substrate such that when beam is vibrated it produces an output signal directly related to rotation of the substrate about an axis perpendicular to the beam and the direction of vibration.

8 Claims, 2 Drawing Sheets

U.S. Patent     Sep. 14, 1999     Sheet 1 of 2     5,952,573

MICRO-BEAM MOTION SENSOR

TECHNICAL FIELD

This invention relates to the field of gyroscopes and rotation sensors, and more particularly to rotation sensors that utilize an oscillating mechanical element to sense rotation in a single plane.

BACKGROUND ART

Many methods have been developed to sense rotation and rotation rate. Gimbaled spinning wheels, ring lasers, and vibrating ring gyroscopes have all been successfully developed for this purpose. However, such existing gyroscope designs tend to be too expensive for many applications.

One prior art method of sensing rotation and rotation rate utilizes a vibrating mechanical element in which the Coriolis force that arises when the element is rotated is used to measure rotation rate. Devices of this type include the hemispherical resonator gyroscope and the vibrating ring gyroscope. Such vibratory gyroscopes have no rotating parts and are easily miniaturized using known micro-machining techniques. However, these gyroscopes tend to be very expensive.

Another method utilizes a rotation sensor based on a vibrating mechanical element, preferably a cantilever micro-beam, induced to laterally oscillate. In the prior art, such micro-beams are coupled directly to a stationary mounting structure. As the beam is vibrated, the vibration amplitude is measured by sensing the change in electrical capacitance between the moving beam and its stationary mounting structure. The magnitude of capacitance change is commonly on the order of femptofarads. As a result of such low capacitance levels, it becomes necessary to minimize the lead length connecting the beam with its associated measuring and control electronics so that the associated electronics must be fully integrated on the same chip as the micro-beam. This requirement is stressed in the published literature on the subject, such as: "Surface Micromachined Accelerometers" by B. E. Boser and R. T. Howe in IEEE Custom IC Conference, May 1995; and "A Surface Machined Silicon Accelerometer With On-Chip Detection Circuitry" by W. Kuehnel and S. Sherman in Elsevier Science Sensors and Actuators, 1994.

Further, considerable risk is involved in developing such a custom-designed, analog, integrated circuit in the absence of breadboard capability. Typically, more than one cycle of mask development, with its attendant costs, is required to produce the optimum configuration of the device.

However, there are situations where it is desirable to use the micro-beam gyroscope to utilize the "no wear-out" characteristics inherent in the device, but where less-than-maximum accuracy is required.

The present invention provides such a device along with compatibility with external breadboard electronics which, together with the relative simplicity of its electronics, eliminates the complex electronics, manufacture, and associated costs attendant with the prior art devices.

SUMMARY OF THE INVENTION

The present invention seeks to provide a low cost, long life, rotation sensor suitable for use in various applications in aircraft, spacecraft and the like.

The rotation sensor is based on an oscillating mechanical element, preferably a cantilevered micro-beam, that is mounted to a substrate base at one end and free to vibrate at the other end. The beam is positioned in the X-Y plane and is induced to oscillate along the Z-axis, i.e., "perpendicular" thereto.

According to the present invention, the cantilevered beam is fabricated using photolithographic techniques in five layers formed along the longitudinal axis of the beam. The beam incorporates three layers of conducting (or semi-conducting) material forming top and bottom outer layers and an inner layer. Each outer layer of conducting material is separated from the middle layer of conducting material by a layer of insulating material. The middle conductive layer may be thicker than the outer conductive layers in order to provide the principal mechanical element of the beam.

A conductive end plate is fabricated across the free end of the beam, electrically connecting the three conductive layers. The bottom outer conductive layer is formed on a substrate at the beam's fixed end.

The substrate and the connected outer conductive layer are at electrical ground and the remaining outer conductive layer is connected, at the fixed end of the beam, to a DC voltage source. The middle conductive layer is connected at the fixed end of the beam to an AC-coupled amplifier.

A DC voltage is applied between the two outer conductive layers at the fixed end of the beam and the voltage at the middle conducting layer adjacent the beam's fixed end is capacitively coupled into the amplifier.

Inducing the beam to oscillate in a direction perpendicular to the longitudinal axis or plane of the beam produces an AC voltage as measured at the middle conducting layer. This is due to a "strain gauge" effect resulting from the alternate compression and stretching of the outer conductive layers. As the beam flexes in the upward direction, the top outer conductive layer compresses, reducing the resistance of the layer. At the same time, the bottom conductive layer stretches, increasing the resistance of that layer. This change in resistance of the layers acts as a voltage divider, increasing the voltage at the middle layer.

Conversely, as the beam oscillates in the downward direction, the top conductive layer is stretched and the bottom conductive layer is compressed. The resultant changes in resistances causes a decrease in the voltage at the center conductive layer.

While the substrate to which the oscillating beam is attached is at rest, the peak-to-peak AC voltage output at the center layer is in equilibrium. As the substrate is rotated about an axis perpendicular to the longitudinal axis of the beam, the "strain gauge" effect is altered resulting in a change to the peak-to-peak AC voltage at the middle layer. This change in the peak-to-peak AC voltage is indicative of the direction and rate of rotation of the substrate.

One of the advantages of the present inventive sensor is the simplicity of the associated electronics. Another primary advantage is its low impedance. The low impedance eliminates the requirement to co-locate the associated electronics on the same micro-chip as the micro-beam. Also, this is significant during the development phase of the sensor (micro-gyro) because it facilitates use of breadboard electronics external to the package containing the beam. Once the electronic circuit is fully developed and tested, it can be integrated into the same package if desired.

BRIEF DESCRIPTION OF THE DRAWINGS

These and other features, aspects and advantages of the present invention will become better understood with reference to the following description, appended claims, and accompanying drawings where:

DESCRIPTION OF A PREFERRED EMBODIMENT

Figure 1:
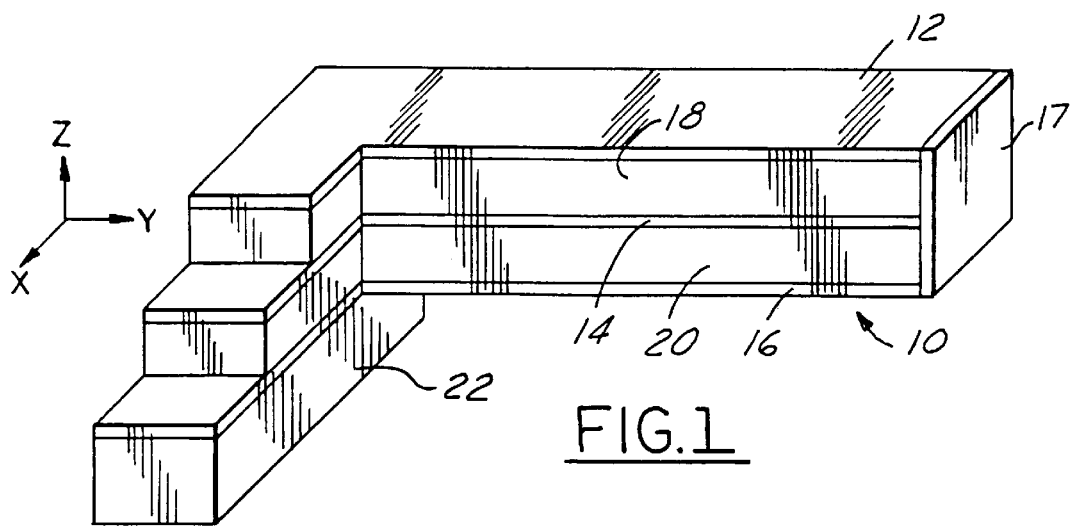
FIG. 1 is a perspective view of the cantilever micro-beam of the present invention.

Referring now to the drawings and initially to FIG. 1, the rotation sensor of the present invention is referred to generally as micro-beam 10. The invention is based on an oscillating mechanical element that is mounted to a substrate base at one end and free to vibrate at the other end. Beam 10 is positioned in the X-Y plane and has its longitudinal axis along the Y-axis. Beam 10 is induced to oscillate along the Z-axis, i.e., "perpendicular" thereto as shown by the up-down directional arrow.

Figure 2:
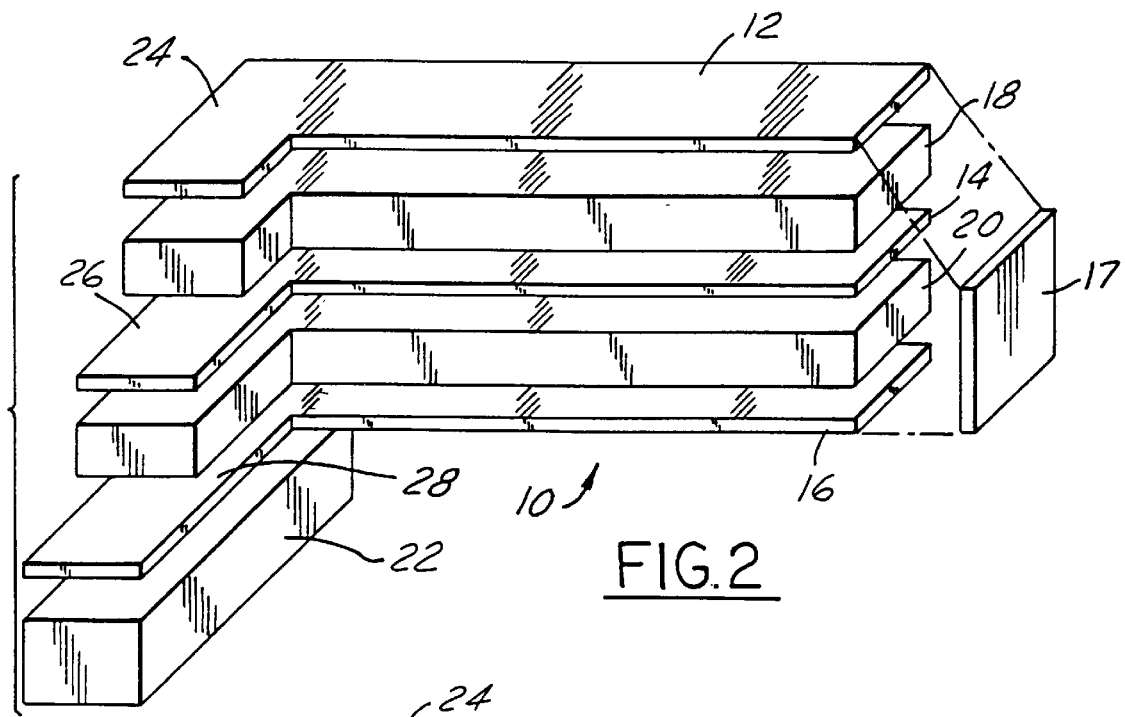
FIG. 2 is an exploded view of the perspective view of FIG. 1.

According to the present invention, and referring also to FIG. 2, the cantilevered beam 10 is fabricated using well-known photolithographic techniques in five layers (12, 14, 16, 18, 20) formed along the longitudinal axis of the beam. The invention incorporates three layers of conducting (or semi-conducting) material forming top and bottom outer conducting layers 12 and 16, respectively, and an inner conducting layer 14. The outer layers 12 and 16 of conducting material are separated from the middle layer 14 of conducting material by layers 18 and 20, of insulating material. Also, the middle conductive layer 14 may be thicker than the outer conductive layers 12 and 16 in order to provide the principal mechanical element of the beam 10.

A conductive end plate 17 is fabricated across the free end of the beam 10 and electrically connects the three conductive layers 12,14,16. The bottom conductive layer 16 is formed on a substrate 22 at one end of beam 10 preventing movement of that end, except with respect to movement of the substrate 22.

Figure 3:
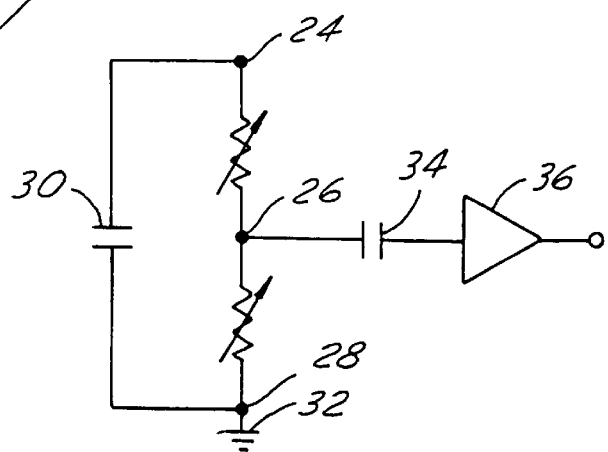
FIG. 3 is an electrical schematic equivalent of the beam of FIGS. 1 and 2.

Referring also to FIG. 3, the substrate 22 and the connected bottom conductive layer 16 are connected at electrical connection pad 28 to electrical ground 32 and top conductive layer 12 is connected, at electrical connection 24 to a DC voltage source 30. The middle conductive layer 14 is connected at electrical pad 26 through a capacitor 34 to a high gain amplifier 36. As the method of electrical connection to the conductive layers 12,14,16 is not germane to the invention, the present depiction is by way of example only and not by way of limitation.

A DC voltage is applied between the outer conductive layers 12 and 16 through connections 24 and 28. The voltage at connector 26 on the middle conducting layer 14 is capacitively coupled via capacitor 34 into the amplifier 36.

Inducing the beam 10 to oscillate along the Z-axis in a direction perpendicular to the X-Y plane in which the beam lies produces an AC voltage as measured at the middle conducting layer 14. This is due to a "strain gauge" effect resulting from the alternate compression and stretching of the top and bottom conductive layers 12 and 16, respectively. As the beam 10 flexes in the upward direction as shown by the up-down arrow in FIG. 1, the top conductive layer 12 compresses, reducing the resistance of that layer. At the same time, the bottom conductive layer 16 stretches, increasing the resistance of that layer. This change in resistance of the layers 12 and 16 acts as a voltage divider as shown in FIG. 3, increasing the voltage at the middle layer 14.

As oscillation causes the beam 10 to flex in the downward direction, the top conductive layer 12 is stretched and the bottom conductive layer 16 is compressed. The resultant change in resistances in layers 12 and 16 results in a decrease in the voltage at the center conductive layer 14.

Figure 4:
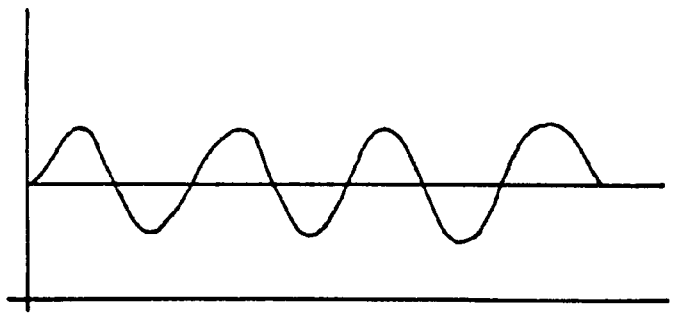
FIG. 4 depicts an AC voltage signal waveform at the middle conductive layer with the substrate at rest.
Figure 5A:
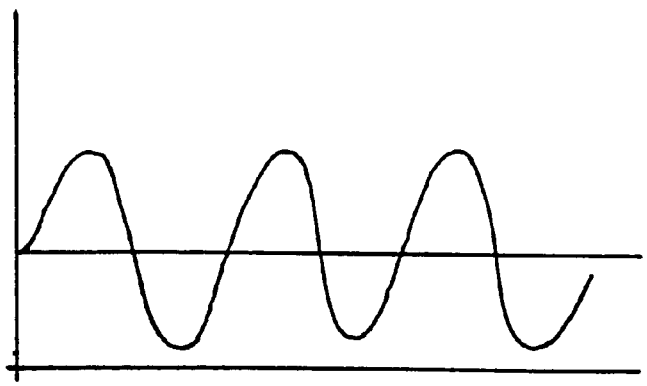
FIGS. 5a & b depict typical AC voltage waveforms at the middle conductive layer when the substrate is rotating.
Figure 5B:
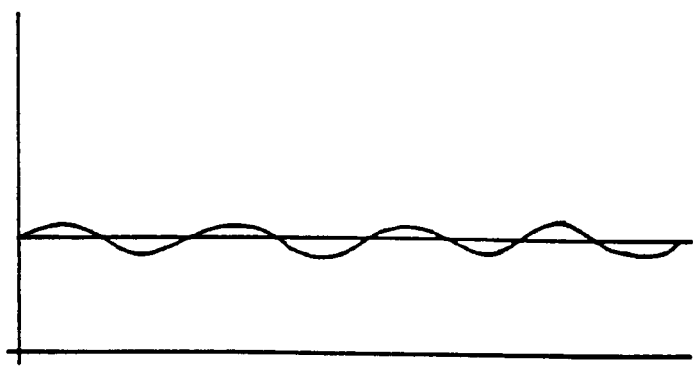

While the substrate 22 to which the oscillating beam 10 is attached is not rotating, the peak-to-peak AC voltage output at middle layer 14 is held at a peak-to-peak amplitude level dependent upon the conductive material used in the layers 12,14,16 and the value of DC voltage impressed across layers 12 and 16. A representative signal waveform depicting this condition is shown in FIG. 4. As the substrate 22 is rotated about the X-axis which is perpendicular to the longitudinal axis of the beam 10, beam 10 is moved in the direction of rotation, either up or down as shown by the up-down arrow of FIG. 1. This results in the "strain gauge" effect being altered resulting in a change to the peak-to-peak AC voltage at the middle layer 14. Referring now to FIGS. 5a & b, there is shown the changes in the peak-to-peak AC voltage indicative of the direction and rate of rotation of the substrate 22.

Thus, as long as the micro-beam 10 is in a stable position, the increase and decrease of voltage on middle conducting layer 14 produces AC voltages having determinable peak-to-peak amplitudes equal in the positive and negative transitions. However, as substrate 22 starts to rotate about the X-axis, the direction of rotation will cause the amplitude of the AC signal coupled into amplifier 36 to increase or decrease depending upon the direction of rotation of the substrate, producing an output signal from amplifier 36 proportional to the amount of rotation.

Because only the total, peak-to-peak amplitude of the voltage on middle conducting layer 14 is important, middle conducting layer 14 can be AC coupled to high-gain amplifier 36. Further, as the micro-beam 10 acts as a voltage divider having only very low resistances, the signal on middle conducting layer 14 is not attenuated by stray capacitance on the connection 26 between middle conducting layer 14 and amplifier 36 so that amplifier 36 need not be co-located on the same substrate as micro-beam 10.

While only one embodiment of the invention has been described in detail herein and shown in the accompanying drawings, it will be evident that various further modifications are possible in the arrangement and construction of the components without departing from the scope of the invention.

What is claimed is:

1. A rotation sensor comprising:

an elongated vibrating mechanical element having a longitudinal centerline and first and second ends, the element affixed to a substrate base proximate said first end in a cantilever configuration permitting said second end to oscillate in one plane;

said element fabricated of multiple vertical layers positioned parallel to and along said longitudinal centerline from said first end to said second end;

said layers including a first group of electrically conductive layers and a second group of electrically insulating layers;

said first and second group of layers interleaved to electrically insulate each layer of said first group from the others in said first group;

electrically connecting said first group of layers at the second end of said element; and whereby movement of said second end produces a change in electrical characteristics of said element indicative of the direction and magnitude of such movement in said plane.

2. The rotation sensor of claim 1, wherein said first group of layers includes a top, middle, and a bottom layer and said second group of layers includes a first insulating layer positioned between said top and middle layers and a second insulating layer positioned between said middle and bottom layers;

a voltage source connected between said top layer and said bottom layer with said bottom layer maintained at electrical ground; and whereby movement of the second end of said element stresses the top and bottom layers changing the resistance in each, generating an output signal at said middle layer indicative of the direction and the magnitude of the movement.

3. The rotation sensor of claim 2, wherein said element is a cantilevered micro-beam formed on the substrate base using photolithographic processes with each of said top, middle and bottom layers having a determinable electrical resistance.

4. The rotation sensor of claim 3, wherein rotation of the substrate base about an axis perpendicular to the longitudinal center line and to the plane of oscillation of the beam causes a change in the output signal at the middle layer indicative of the direction and magnitude of rotation of the substrate base.

5. The rotation sensor of claim 1, wherein said output signal at said middle layer is AC coupled into a high gain amplifier to permit detection of very small degrees of rotation of the substrate body.

6. The rotation sensor of claim 1, wherein the number of layers in said first group is one more than the number of layers in said second group.

7. The rotation sensor of claim 3, wherein the thickness of the middle layer is greater than the thickness of the top and bottom layer to provide mechanical integrity to the beam.

8. The rotation sensor of claim 3, wherein;

flexing the beam in the direction of the top layer causes said top layer to compress and the bottom layer to stretch, reducing the resistance of said top layer and increasing the resistance of said bottom layer, thereby increasing the measured voltage on the middle layer; and flexing the beam in the direction of the bottom layer causes said top layer to stretch and the bottom layer to compress, increasing the resistance of said top layer and decreasing the resistance of said bottom layer, thereby decreasing the measured voltage on the middle layer.

* * * * *